Dec. 13, 1966 R. LEMKELDE 3,291,296
PIPE NIPPLE HOLDER
Filed Oct. 26, 1964 2 Sheets-Sheet 1
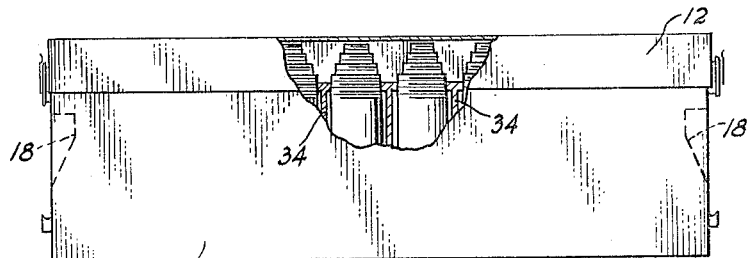
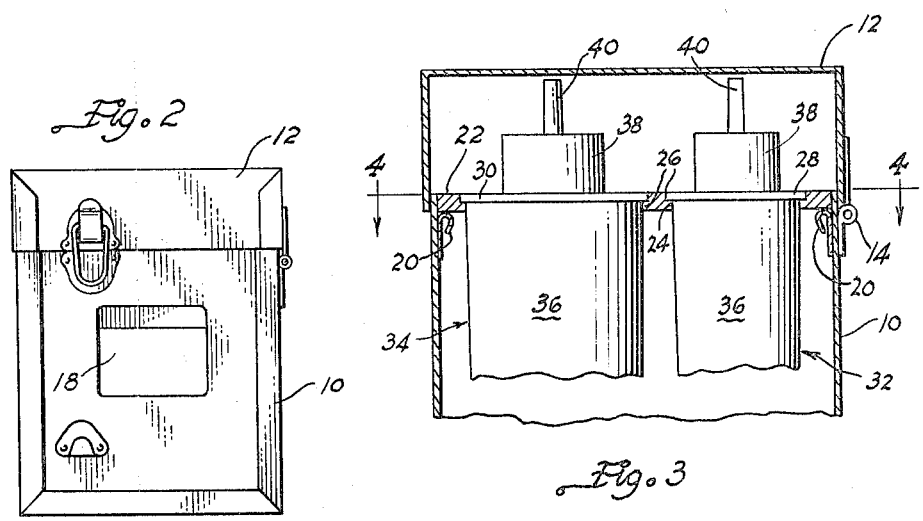
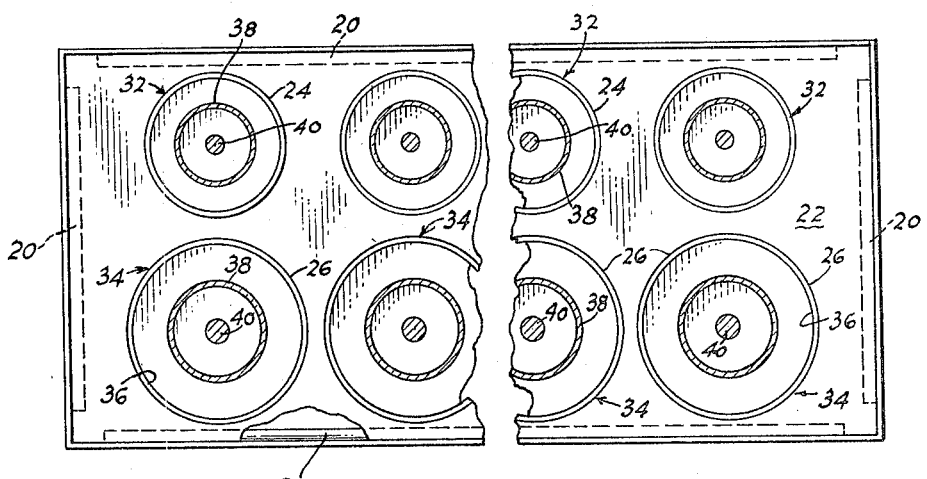
INVENTOR.
RUSSELL LEMKELDE
BY
ATTORNEY Dec. 13, 1966      R. LEMKELDE      3,291,296
PIPE NIPPLE HOLDER
Filed Oct. 26, 1964      2 Sheets-Sheet 2
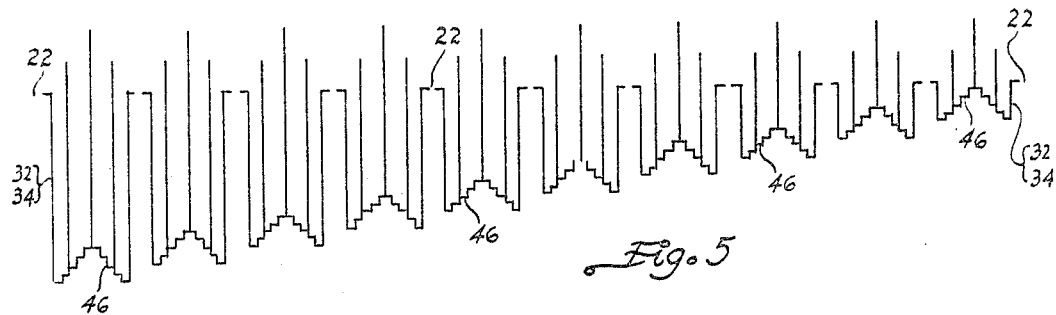
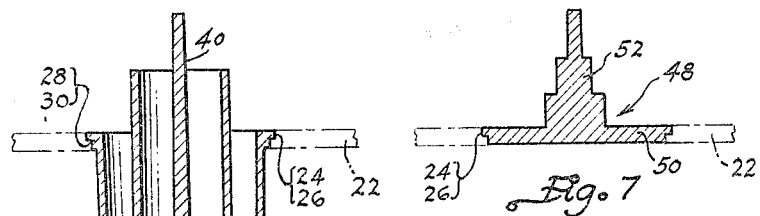
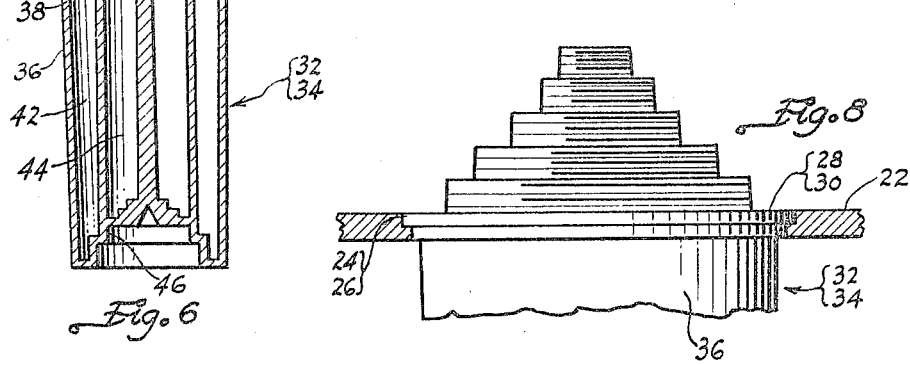
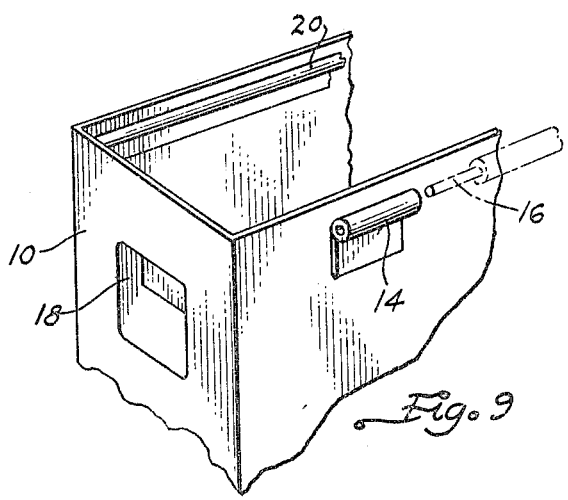
INVENTOR.
RUSSELL LEMKELDE
BY
ATTORNEY ably flat supporting member having
United States Patent Office 3,291,296
Patented Dec. 13, 1966

3,291,296
PIPE NIPPLE HOLDER
Russell Lemkelde, R.D. 1, York, Pa.
Filed Oct. 26, 1964, Ser. No. 406,375
10 Claims. (Cl. 206—16)

This invention pertains to improvements in a pipe nipple holder and, more particularly, provides means for simultaneously and compactly holding a wide range of sets of pipe nipples of different diameters and different lengths.

Pipe nipples are manufactured by industrial concerns or, not infrequently, by the plumbers themselves in various lengths ranging anywhere from about one inch up to six or eight inches. Substantially all different available sizes of ordinary pipe also are prepared into nipples because, in plumbing installations, nipples must be employed having diameters corresponding to the pipe and plumbing fittings with which they are to be connected.

In normal plumbing operations, pipe sizes which plumbers are called upon to work with, and considering so-called conventional diameters of pipe only rather than special diameters, such sizes will range in diameter from between approximately one-eighth inch and two inches. Between these extreme minimum and maximum diameters of pipe, there will be approximately seven intervening diameter sizes. Considering this in conjunction with the fact that pipe nipples usually vary in length by increments of approximately ½ inch and range all the way from approximately one inch long to six or eight inches long, it will be seen that, in order for a plumber to carry a substantially complete set of all conventional, normally and commonly used lengths and diameters of pope nipples, even only a single nipple of each length and diameter will constitute a very large number and, correspondingly, constitute a very substantial bulk and weight.

At present in the plumbing industry, it is conventional for a plumber to endeavor to carry on his truck as close as possible to a complete set of all diameters and lengths of commonly used pipe nipples. One of the commonest ways of carrying the same however, is to have the nipples dumped helter-skelter into metal buckets, wooden boxes, or the like. Hence, when a plumber needs a certain length or diameter of pipe nipple, it usually is necessary to either scramble through the bucket full or box full, or usually dump the entire stock out on a suitable surface to try to find the diameter and length of pipe nipple he is seeking. Obviously, this is a highly unsatisfactory system.

Heretofore, certain attempts have been made to provide containers or kits for pipe nipples but those with which the present inventor is acquainted have had limited capacity and far from adequate accommodation for anything resembling a substantially complete set of all of the common diameters and commonly used lengths of pipe nipples.

To overcome the foregoing deficiency in existing pipe nipple holders, containers or kits, it is the principal object of the present invention to provide a pipe nipple holder having means compactly arranged for receiving and positioning for ready removal from the holder a substantially complete set of all commonly used diameters and lengths of pipe nipples within the exemplary ranges of between one-eighth inch and two inches in diameter and one inch and six inches in length.

It is another object of the present invention to provide positioning means for sets of graduated diameters of pipe nipples, each set being of similar length, but the diameters enabling the nipples to be nested coaxially, said positioning means having stepped coaxial means engageable with the lower ends of said sets of nested nipples in such manner as to dispose the nest of nipples in different vertical levels, the innermost nipple being highest and the outermost nipple lowest, whereby any desired diameter of nipple of such nested set may be engaged at the upper end thereof readily by the fingers of a plumber for removal from this said set.

A further object of the invention is to provide in the aforementioned positioning means or holder a plurality of sleeve means of different diameters capable also of being nested and complementary in the diameters thereof to spaces existing between certain of the nipples of a set of nested nipples so as to interfit between such set of nested nipples and operable to support said nipples in coaxial relationship notwithstanding the removal of one or more of said nipples from the set thereof, such nested positioning sleeve means preferably having a central spindle coaxial therewith.

Still another object of the invention is to provide such nipple holding and positioning means in socket-like arrangements capable of being secured to and depending from a suitable prefera plurality of holes therein from which said socket means depend and said socket means being disposed in close relationship to each other for compactly holding one nipple of each diameter and length within the ranges set forth above within a single supporting member and container therefor.

A still further object of the invention is to provide a nipple holder of the aforementioned types in which the nipple supporting and positioning means in particular are capable of being formed from moldable material, such as appropriate synthetic resin of durable nature readily capable of withstanding shock and rough treatment, thereby affording safety against damage to the threads on the nipples as far as contact with the supporting and positioning means of the nipple holder is concerned.

Still another object of the invention is to provide a pair of such socket-like nipple supporting and positioning means for each set of nipples of the same length, whereby the full range of different diameters of each set of the same length may be disposed alternately in the two different socket means and thereby render the entire set of nipples capable of being nested not only with respect to other nipples in the set but also provide spaces between the nested nipples to permit the nipple positioning members of the holder to be disposed in suitable spaces between successive diameters of nipples in the nested set.

Details of the foregoing objects and of the invention, as well as other objects thereof, are set forth in the following specification and illustrated in the accompanying drawings comprising a part thereof.

In the drawings:

FIG. 1 is a side elevation of a pipe nipple holder embodying the principles of the present invention and partly broken away to show details of certain exemplary nested sets of nipples contained therein.

FIG. 2 is an end elevation, on a larger scale than in FIG. 1, of the pipe nipple holder shown in FIG. 1.

FIG. 3 is a fragmentary vertical transverse elevation, on a still larger scale than employed in FIG. 2, of the pipe nipple holder shown in the preceding figures and illustrating certain details of positioning socket-forming means for nested sets of pipe nipples to be contained within the holder.

FIG. 4 is a plan view of at least the lower portion of the pipe nipple holder container and positioning means shown in FIG. 3 as seen on the line 4—4 of FIG. 3.

FIG. 5 is a vertical elevation comprising a schematic outline of the various heights and nested arrangements of the pipe nipple supporting and positioning means within the socket arrangements for the various nested sets of nipples of graduated diameters as well as the various lengths of said sets of nipples.

FIGS. 6 and 7 respectively are vertical sectional views on a larger scale than employed in FIG. 5 but showing exemplary nested and coaxial nipple-supporting and positioning means corresponding to the socket means at opposite ends of the holder shown in FIGS. 1 and 4.

FIG. 8 is a fragmentary vertical elevation showing the upper ends only of a set of nested pipe nipples of the same length but disposed by the socket means within which they are positioned so as to be positioned at graduated elevations progressively higher from the outer diameter to the innermost diameter, thereby to facilitate removal of any desired nipple from the set.

FIG. 9 is a fragmentary perspective view showing one end of the container of the nipple holder shown in FIGS. 1–3 and illustrating exemplary means by which the cover of the box might be hingedly connected but also removable from the lower box portion.

Particularly for convenience of handling, as well as to provide suitable strength to support a substantially full range of all common sizes of pipe nipples from approximately one-eighth inch in diameter to two inches in diameter, and from one inch in length to approximately six inches in length, and especially to enable certain groupings of said nipples to be supported in nested relationship for compactness, the pipe nipple holder comprising the present invention includes a preferably metallic box 10 having a complementary metal cover 12 arranged to be fitted over at least the upper edge portion of the sides and ends of the box 10 as shown in FIG. 3. If desired, the cover 12 may be connected by separable hinge means 14, details of the operation of which are shown in fragmentary manner in FIG. 9 wherein it will be seen that a telescopic hinge pin 16 fits within the socket of the hinge 14. However, when the cover 12 is disposed in closed relationship with respect to box 10 as shown in FIG. 3, it is obvious that there will be no longitudinal movement of cover 12 relative to box 10 and the elements of the hinge will remain intact. Further, opposite ends of the box 10 are provided with recessed members 18 to form handles or handling means of such nature as not to provide any obstruction and thereby facilitate close packing of a series of such pipe nipple holders in a truck or warehouse as well as preventing damage to the handle means.

Extending around the interior of box 10 adjacent the upper edge thereof are longitudinally extending abutment members 20, the upper surfaces of which are all within a common horizontal plane for purposes of receiving, in abutting manner against said upper edges, a preferably flat supporting member 22 which, for example, may be formed from a suitable thickness of synthetic resin or plastics capable of sustaining substantial weights and resisting appreciable physical shocks without damage. Formed within the supporting member 22 are two rows of holes 24 and 26, all of the holes 24 being of the same diameter but slightly less in diameter than the holes 26. All of the holes 26 likewise are of the same diameter. As best shown in FIG. 3, all of the holes 24 and 26 preferably have circular shoulders to comprise supporting abutments for receiving supporting flanges 28 and 30 respectively formed on the upper ends of two different diameters of socket means 32 and 34 which are of a composite nature as now will be described.

Each of the socket means 32 and 34 preferably are formed from appropriate moldable material such as synthetic resins similar to that from which the supporting member 22 is formed for example. If desired however, said socket means, as well as supporting member 22, may be formed from appropriate metal or the like. Each of the socket means 32 and 34 are of similar general construction but are of different diameters and also of different graduated lengths represented in schematic fashion in FIG. 5. Preferably, the socket means 32 and 34 each comprise a plurality of sleeve means 36 and 38 of different diameters and a central spindle 40 for purposes of providing at least a pair of concentric annular spaces 42 and 44 therebetween for purposes to be described. It will be seen that, in accordance with the preferred construction of the composite socket means 32 and 34 shown in FIG. 6 that the coaxial and concentric sleeve means 36 and 38 and the central spindle 40 are substantially of the same length but are positioned at progressively higher elevations from the outermost sleeve 36 to the inner spindle 40 by the stepped positioning means 46 which comprises a bottom for the socket means and preferably is molded integrally with the coaxial members extending upwardly therefrom simultaneously at the time the entire composite socket means is formed preferably from moldable material of this type referred to above. Also, the socket means 32 and 34 preferably are secured to the supporting member 22 by cementing or otherwise affixing the supporting flanges 28 and 30 of the socket means against the above-described annular shoulders in the holes 24 and 26.

In accordance with conventional plumbing and pipe fitting practice, pipe nipples range in diameter from one-eighth inch to about two inches. Greater diameters are available but the range referred to covers the most commonly used ones. Such a range includes nine different diameters comprising one-eighth inch, one-quarter inch, three-eighth inch, half-inch, three-quarter inch, one inch, one and one-quarter inches, one and one-half inches, and two inches. Of these sizes, it is found that the nipples which are one-eighth inch, three-eighth inch, three-quarter inch, and one and one-quarter inches in diameter readily will nest within each other coaxially while nipples having diameters of one-quarter inch, one-half inch, one inch, one and one-half inches, and two inches likewise will nest within each other coaxially. Hence, it will be seen that of the nine different diameters of nipples of a given length for example, they can be divided into groups of four and five nested assemblies which are compact. Accordingly, by selecting the outermost sleeve means 36 of each of the two different sizes of socket means 32 and 34 respectively to receive the outermost nipple of the aforementioned two groups or assemblies thereof, namely, the inch and one-quarter diameter nipple and the two inch diameter nipple, and proportionately selecting the diameters of the intermediate sleeve means 38 and spindle 40, the nested assemblies referred to respectively can be received within and positioned by the socket means 32 and 34.

To facilitate the selection and removal of any desired nipple from either of the nested assemblies of each set of nipples of uniform diameter, the stepped positioning means 46 in the bottom of each of the socket means 32 and 34 so engage the lower ends of the nested nipples as to support the same with the upper ends thereof in graduated elevations differing preferably in the order of between one-quarter inch and three-eighths of an inch, so as to dispose the same somewhat in the arrangement illustrated in exemplary manner in FIG. 8. Such arrangement, incidentally, is of the nested group of five nipples comprising those having diameters of one-quarter inch, one-half inch, one inch, one and one-half inches, and two inches. Similar stepped positioning bottom means 46 will be provided in the other socket means to receive the nested group of four supplemental diameters of nipples of the same length as those just discussed, for example, but the stepped arrangement of said bottom positioning means will have only four different levels respectively for the four different diameters of nested nipples to be supported thereby, the same not being specifically illustrated in the drawings but the slightly different diameters of the nested sleeve means and spindle thereof can be appreciated from an observance of FIGS. 3 and 4.

As referred to hereinabove, pipe nipples are available in graduated lengths, in addition to being available in various diameters. For convenience, and to minimize cutting and threading, commercial type pipe nipples are available in graduated lengths of one-half inch difference ranging between substantially one inch and six inches. Accordingly, the various pairs of socket means 32 and 34 are provided in graduated depths or lengths from one end to the other of the supporting member 22 and box 10 for example, the endmost pair of socket means 32 and 34 adjacent one end of the same accommodating nested sets of nipples all of six inches in length and progressing with decreasing depths of one-half inch each toward the opposite end of the supporting member and box until the endmost socket means illustrated in exemplary manner in FIG. 7 actually is a stepped positioning member 48 having a base plug 50 of suitable diameter to fit within the hole 24 or 26 to receive the same in supporting member 22. Also, in view of the fact that pipe threads taper substantially, nipples of one inch length in the larger diameters are not practical, whereby in the one inch length of nipples, only substantially the five smallest diameters of the same are available. Accordingly, in the specific example of stepped positioning member 48 shown in FIG. 7, three relatively small diameter nested nipples of one inch each in length are supported thereby on the stepped spindle 52 and, on the companion stepped spindle, only two steps are provided so that between the two of them, five nipples are supported.

Referring to FIG. 5, the specific illustration of a row of exemplary socket means represents variations in one-half inch in length for example between the various sets of nested nipples of graduated diameters. According to the arrangement of stepped bottom positioning means 46, the socket means actually are the type which will accommodate five nested nipples of graduated diameters but of the same lengths and it will be understood without burdening the drawings with additional showing that an adjacent row of such socket means will have stepped bottom positioning means 46 in which only four concentric stepped levels of progressively higher elevations towards the middle are provided.

From the foregoing, it will be seen that the present invention provides a highly compact, convenient, efficient, and effective holder for a substantially complete set of all conventional lengths of pipe nipples between one inch and six inches, and all diameters of each length between one-eighth inch and two inches, for example. By specifying these lengths and diameters however, it is not intended to restrict the invention to said exact lengths and diameters since the spirit of the invention may be applied to pipe nipples of other lengths and diameters. One nipple of every such length and diameter may be positioned within said pipe nipple holder and effectively supported for ready removal from the particular socket means containing the desired nipple and following such removal, no collapsing of the remaining nested set of nipples of the same length will occur due to the concentric sleeve means and spindle in each socket means. Further, by providing two or three such pipe nipple holders filled with full complements of nipples to be carried to a plumbing job, an ample supply of nipples normally required in the performance of average plumbing jobs will be available. Obviously, if a plumber knows that a substantial number of any given sizes, both as to diameter and length of nipples is to be required on a job, he will carry such required number of desired size or sizes in addition to the complete sets of nipples contained within the pipe nipple holder comprising the present invention.

In addition to comprising ready means for carrying a complete set of all average and normal diameters and lengths of pipe nipples to and from a job, the pipe nipple holder comprising the present invention also provides ready means for use in stock rooms and warehouses for holding pipe nipples until ready for use. In addition, said holder is readily usable for purposes of quickly determining inventory of certain lengths and diameters of pipe nipples. For maximum convenience, if desired, suitable indicia may be formed upon the supporting member 22 at least to indicate the length of nipples in the various pairs of socket means 32 and 34. In addition to the ability to hold the nested sets of nipples for ready accessibility, the pipe nipple holder of the present invention, by including enclosing means and particularly a cover for the box 10 within which the complete complement of nipples are supported renders the orderly maintenance of such nipples in their proper position against the danger of being spilled in the event the holder is knocked over, yet when it is desired to have the nipples ready for instant use on a job, the cover 12 preferably is of such type that it can be completely removed from the box 10 whereby all of the upper ends of all nipples of each set of various lengths and diameters instantly available and, if desired, the bottom of the box can be placed in the inverted top to prevent damage thereto.

While the invention has been described and illustrated in its several preferred embodiments, it should be understood that the invention is not to be limited to the precise details herein illustrated and described since the same may be carried out in other ways falling within the scope of the invention as claimed.

I claim:

1. A pipe nipple holder comprising socket means arranged to receive a plurality of graduated diameters of pipe nipples of similar lengths and sufficiently different diameters to permit the same to be disposed in nested and coaxial relationship, and positioning means in the bottom of said socket means engageable by said nipples in a manner to position the upper ends of said nipples at different vertical levels, the innermost nipple being highest and the outermost one lowest to facilitate manually grasping any desired diameter of nipple desired among said nested nipples when supported by said holder.

2. The pipe nipple holder according to claim 1 in which said positioning means is stepped and said stepped elevations are coaxial.

3. A pipe nipple holder comprising a supporting member, a plurality of socket means supported by said member and each being arranged to receive a set of graduated diameters of pipe nipples of similar lengths and sufficiently different diameters to permit the same to be disposed in nested and coaxial relationship, said socket means being of graduated depths respectively to receive nested sets of pipe nipples of graduated lengths but the nipples of each set being similar in length, positioning means in the bottom of each socket means engageable by the nipples of each set in a manner to position the upper ends of said nipples of each set at different vertical levels with respect to each other, the innermost nipple being highest and the outermost one lowest in each set to facilitate manually grasping any desired diameter of nipple desired among said plurality of sets of nested nipples when supported by said holder.

4. The pipe nipple holder according to claim 3 in which said positioning means in the bottom of each socket means is stepped and said stepped elevations are coaxial.

5. The pipe nipple holder according to claim 3 in which said supporting member is substantially flat and provided with a plurality of apertures, said socket means depending respectively from said apertures.

6. The pipe nipple holder according to claim 5 further including side and end members depending from the edges of said flat supporting member to form a box-like enclosure, said end members having handling recesses formed therein for lifting said enclosure and contents.

7. A pipe nipple holder to receive in coaxially nested relationship a plurality of sets of pipe nipples of graduated diameters and comprising a plurality of sets of elongated members of different diameters positioned in coaxially nested relationship, positioning means respectively connecting one end of said members of each set to secure them in the aforesaid relationship, said elongated members having diameters complementary to the diameters of said nipples when nested therewith and operable to interfit with said nipples in coaxially nested relationship, thereby to maintain said nipples substantially in nested relationship following the removal of one or more nipples from a nested set thereof, a support member having a plurality of holes therein of similar diameter, said sets of elongated members being of graduated lengths, the outermost elongated member in each set thereof being connected to the rim of one of said holes in said support member to form a cup containing the other nested and coaxial elongated members of each set, said cups being arranged in a series in said support members to receive respectively a progression of sets of graduated lengths of pipe nipples, and means engageable with said support member to support the same in operative position.

8. A pipe nipple holder comprising a central spindle member and a plurality of sleeve members of different diameters substantially of the same length as the spindle and nested therewith, and stepped means fixed to one end of the outermost sleeve to form a socket containing the other nested members, said other nested members being fixed to said stepped means and supporting the same in upwardly graduated relationship from the outermost sleeve to said central spindle, said nested members being arranged to receive a series of pipe nipples of similar length and graduated diameters capable of being nested and complementary to said nested members so as to be nested therewith for support in coaxial relationship to each other.

9. The pipe nipple holder according to claim 8 in which said nested members and stepped means are formed integrally from molded material.

10. The pipe nipple holder according to claim 8 further including a support member having a hole therein, the upper end of the outermost sleeve member being fixed to said support member adjacent the rim of said hole, and box-like means surrounding the perimeter of said support member to enclose said nested members.

References Cited by the Examiner
UNITED STATES PATENTS

| | | | |
|---|---|---|---|
| 1,978,290 | 10/1934 | Arthur | 211—13 |
| 2,988,205 | 6/1961 | Barlow | 206—16 |
| 3,083,824 | 4/1963 | Ness | 206—65 |
| 3,127,986 | 4/1964 | Hulka | 206—16 |
| 3,190,438 | 6/1965 | Cain et al. | 206—45 |
| 3,221,891 | 12/1965 | Snow | 211—13 |

THERON E. CONDON, *Primary Examiner.*

WILLIAM T. DIXSON, Jr., *Examiner.*